Patented Feb. 20, 1940

2,191,103

UNITED STATES PATENT OFFICE 2,191,103

AZO DYESTUFFS INSOLUBLE IN WATER

Werner Zerweck and Wilhelm Kunze, Frankfort-on-the-Main-Fechenheim, Germany, assignors to General Aniline & Film Corporation, a corporation of Delaware No Drawing. Application August 23, 1938, Serial No. 226,248. In Germany August 30, 1937

2 Claims. (Cl. 260—204)

This invention relates to azodyestuffs insoluble in water, more particularly to those of the general formula:

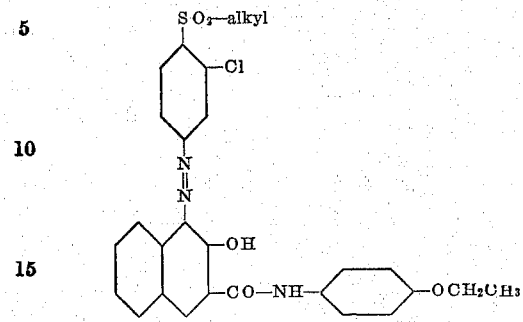

The present new dyestuffs may be prepared by combining in substance or on a substratum a diazo compound of an amine of the general formula:

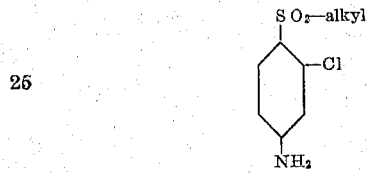

with 1-(2',3' - hydroxynaphthoylamino) - 4 - ethoxybenzene. The aromatic amines employed as diazo components may be prepared for example according to the statements of the Franch Patent No. 803,191, Example 4.

The new dyestuffs prepared in substance are suitable for the manufacture of lacquers. When prepared on vegetable fibers according to the usual dyeing and printing methods, the dyestuffs yield valuable orange dyeings and prints which are distinguished by excellent fastness to light and weather.

In order to further illustrate our invention the following examples are given, the parts being by weight and all temperatures in degrees centigrade.

EXAMPLE 1

20.6 parts of 4-amino-2-chlorophenyl-methylsulfone are introduced into 33 parts of nitrosylsulfuric acid of 40% strength. When the solution is complete, the mass is poured on ice while stirring. In this way a clear diazo-solution is obtained which is allowed to run into an aqueous suspension of 32 parts of 1-(2',3'-hydroxynaphthoylamino) - 4 - ethoxybenzene containing an excess of sodium acetate. When the combination is complete, the dyestuff formed of the formula:

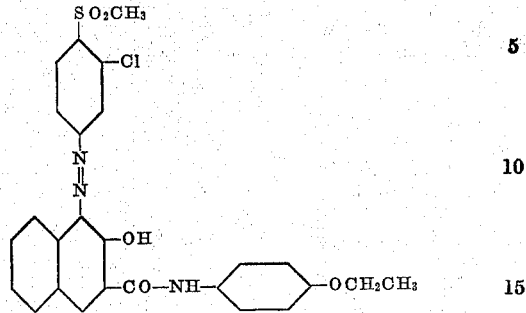

is filtered off, washed and dried. It is distinguished by a very good fastness to light and weather and may be used for the manufacture of color lakes.

Dyestuffs distinguished by similar shades and fastness properties are obtained by employing instead of 4-amino-2-chlorophenyl-methylsulfone the corresponding ethyl-, propyl- or butylsulfones.

EXAMPLE 2

50 g. of boiled cotton yarn are treated with the impregnating bath (a) for half an hour, then freed from the adhering liquid by winding, squeezing or centrifuging and while wet, dyed in the developing bath (b) for half an hour. Then the dyed goods is rinsed, soaped at the boil, rinsed once more and dried.

Impregnating bath (a)

6 g. of 1-(2',3'-hydroxynaphthoylamino)-4-ethoxybenzene, 10 ccs. of Turkey red oil and 10 ccs. of caustic soda lye of 38° Bé. are made into a paste and then dissolved in 120 ccs. of hot water. After the addition of 10 ccs. of formaldehyde of 30% strength at 40°, the solution is made up to 1 liter by the addition of cold water.

Developing bath (b)

3.2 g. of 4-amino-2-chlorophenyl-methylsulfone are diazotized in the usual manner and to the diazo solution obtained an excess of sodium acetate is added. Then the solution is made up to one liter by the addition of water.

In the above described manner a dyestuff of the same constitution as described in Example 1 is formed on the fiber whereby strong yellowish-orange dyeings of excellent fastness to light and weather are obtained.

Similar valuable dyeings of likewise excellent fastness to light and weather are obtained by employing as diazo-component instead of 4-amino-2-chlorophenyl-methylsulfone the corresponding ethyl-, propyl- or butylsulfones.

Similar strong orange shades are obtained according to one of the usual printing methods.

We claim:

1. Azodyestuffs insoluble in water of the general formula:

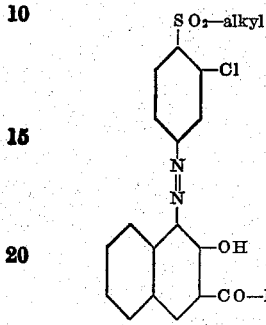

which dyestuffs are useful for the manufacture of orange color lakes and yield, when prepared on vegetable fibers, strong orange dyeings and prints of excellent fastness to light and weather.

2. The water-insoluble azodyestuff of the formula:

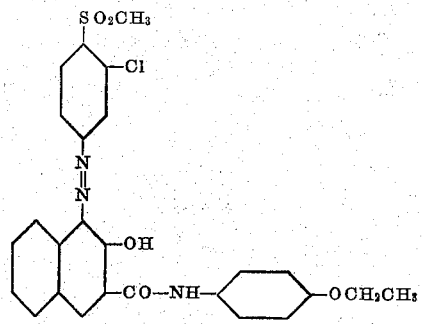

which dyestuff is suitable for the manufacture of orange color lakes and yields, when prepared on vegetable fibers, strong yellowish-orange dyeings and prints of excellent fastness to light and weather.

WERNER ZERWECK.
WILHELM KUNZE.